Figure 1:
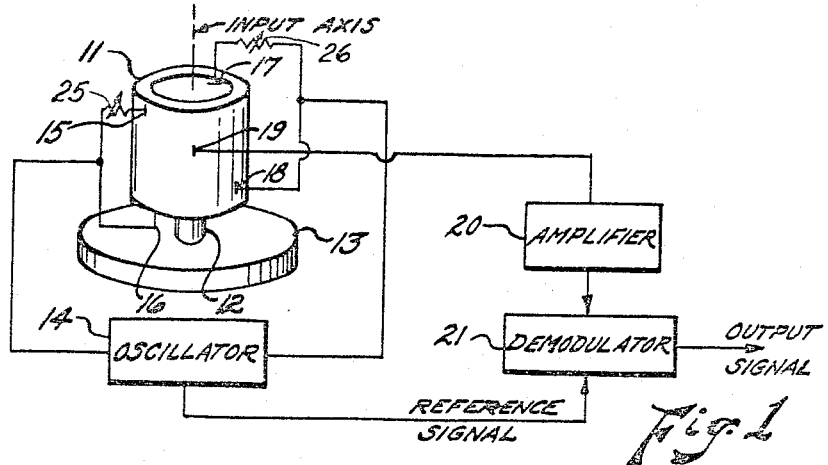

March 21, 1967     A. L. SIMMONS ET AL     3,309,929

IMPEDANCE TUNING OF A PIEZOELECTRIC DEVICE

Filed March 16, 1964

INVENTORS
ARTHUR L. SIMMONS
AND JOHN J. BUCKLEY
BY
ATTORNEYS

United States Patent Office 3,309,929
Patented Mar. 21, 1967

3,309,929
IMPEDANCE TUNING OF A PIEZOELECTRIC DEVICE
Arthur L. Simmons, Annapolis, and John J. Buckley, Baltimore, Md., assignors, by mesne assignments, to the United States of America as represented by the Secretary of the Air Force
Filed Mar. 16, 1964, Ser. No. 352,403
2 Claims. (Cl. 73—505)

This invention relates to a piezoelectric device and, more particularly, to a piezoelectric vibragyro and the impedance tuning thereof.

A piezoelectric vibragyro is a thin-wall cylinder of piezoelectric material which is electrically driven in such a manner that the ends radially contract and expand alternately (180 degrees phase difference) to effect cyclical changes in the moments of inertia of the ends of the cylinder. When the cylinder is rotated about its longitudinal axis, the Coriolis effects convert the radial vibration mode into a torsional vibration mode. The amplitude of this torsional vibration is proportional to the angular velocity of the cylinder rotating about its longitudinal axis.

The invention can be used to determine the angular velocity about a given axis of a satellite or other space vehicle. The piezoelectric cylinder is mounted on a base which is in turn mounted on a space vehicle. This angular velocity information can be used in conjunction with a guidance system or autopilot. The vibragyro determines the angular velocity with respect to inertial space.

To produce an efficient device, both vibrational modes are adjusted to have the same resonant frequency. In the past, this has normally been done by slowly grinding the ends to shorten the length of the cylinder which gradually increases the torsional resonant frequency until it coincides with the radial frequency of the ends. This method is time consuming and, if mistakes are made, often irreversible. Another undesirable change in the two resonant frequencies can occur if the electrical impedance of the oscillator circuit does not match the impedance of the circuit used when the cylinder is mechanically tuned.

The invention to be described here furnishes a method for readily adjusting the two vibrational modes of the piezoelectric vibragyro to a common resonant frequency for maximum performance. This method could represent a substantial reduction in the final cost of a piezoelectric vibragyro and is applicable to any piezoelectric device which operates at resonance such as a piezoelectric accelerometer. Also this method could be used in conjunction with an electromechanical vibragyro in which the torsional coupling is a tunable piezoelectric spring.

By connecting the conducting electrodes of a piezoelectric device with a variable impedance and then changing the impedance, the modulus of elasticity will vary. It can be shown that the effective elastic modulus, measured under short circuit conditions, is $(1-K^2)$ times the elastic modulus measured under open circuit conditions, where K is the electromechanical coupling coefficient. For a derivation of this relationship see H. W. Katz, "Solid State Magnetic and Dielectric Devices," John Wiley and Sons, Inc., 1960, page 91.

Consider, for example, a piezoelectric element such as a Bimorph clamped at one end and free to vibrate as a cantilever beam. The beam will have two resonant frequencies depending on whether the electroded surfaces are open or short circuited. Now consider the electroded surfaces as part of a circuit containing a variable resistor. The capacitance of the piezoelectric element and the variable resistor will constitute an R-C circuit which will have a variable time constant. By varying the time constant, the resonance of the beam can be varied through a given frequency range by changing the electromechanical coupling coefficient of the piezoelectric material.

Accordingly, it is an object of the present invention to provide for an improved method of torsional coupling.

It is another object to provide a method of adjusting the radial vibrational mode and the torsional vibration mode of a piezoelectric vibragyro to a common resonant frequency.

It is still another object to provide a method of determining the rotational velocity of a space vehicle.

Figure 2:
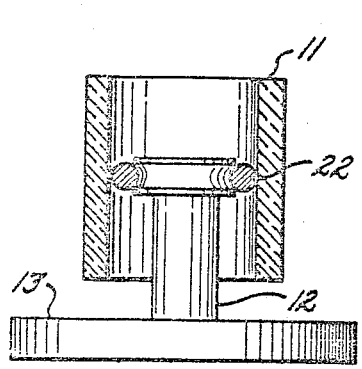
Figure 4:
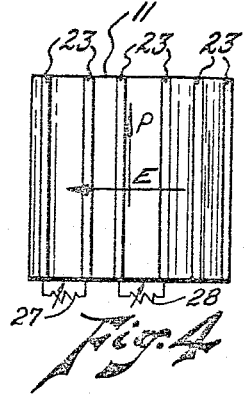
Figure 5:
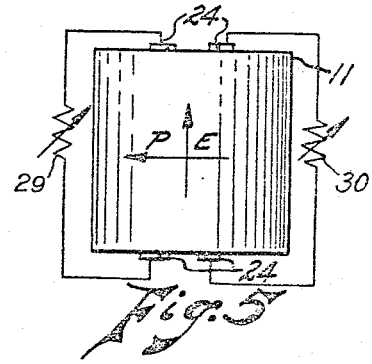
Figure 3:
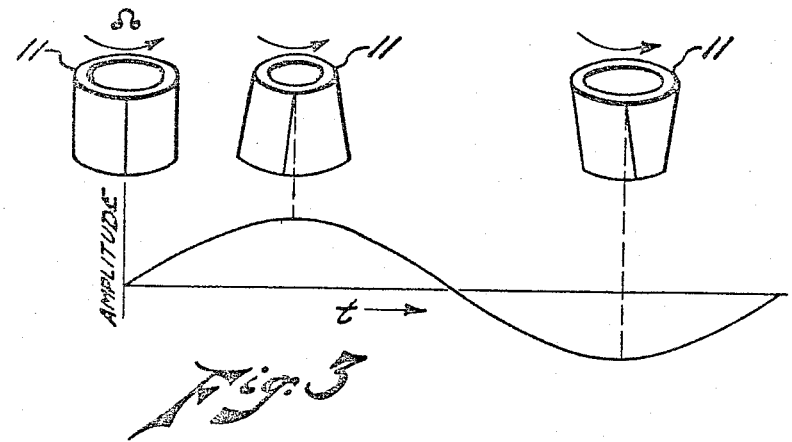

These and other objects may be more fully understood by reference to the following drawing in which:

FIG. 1 is a schematic representation of the vibragyro;
FIG. 2 is an elevation view of the vibragyro in cross section;
FIG. 3 is a schematic representation of the rotating cylinder and a plot of the amplitude of vibration;
FIG. 4 shows the placement of shorting electrodes upon the cylinder; and
FIG. 5 shows an alternative placement of the shorting electrodes.

This technique of effecting changes in the elastic constants for tuning purposes can be applied to either or both vibrational modes of the piezoelectric vibragyro. Portions of the polarized cylinder are plated and connected electrically with a variable impedance. By changing the impedance of the circuit, portions of the cylinder can be made to have an equivalently lower modulus of elasticity with a subsequent lowering of the torsional resonant frequency.

The radial vibration mode can be frequency adjusted in a manner analogous to the torsional mode. This is true whether the end radial modes are driven and the torsional mode is the derived coupled mode or conversely. In the piezoelectric vibragyro, either mode may be driven and the resultant mode used to extract the rate intelligence.

Referring to FIG. 1 in detail, piezoelectric cylinder 11 is mounted to pedestal 12 which is in turn mounted to base 13. Base 13 can be mounted to the object whose rotational velocity is sought. Oscillator 14 is connected to point 16 and variable impedance 25 which is in turn connected to point 15. Oscillator 14 is also connected to point 18 and variable impedance 26 which is in turn connected to point 17. The output of oscillator 14 causes the ends of cylinder 11 to vibrate radially. As cylinder 11 is rotated, the Coriolis effects together with the radial vibration will cause a torsional vibration, the output of which is taken at point 19. The output is amplified by amplifier 20 and then fed to demodulator 21.

FIG. 2 shows how cylinder 11 is mounted to pedestal 12. Since the vibrational mode common to both torsional and radial modes exists at the circumferential mid-point of cylinder 11, O-ring 22 made of insulatory material is connected at this point to pedestal 12.

FIG. 3 shows the contraction of the ends of cylinder 11 and the torsional twisting due to rotation. The amplitude of the twisting is proportional to the angular velocity Ω.

The technique for equivalently changing the elastic constants is applicable to either mode and can be applied simultaneously. When cylinder 11 is polarized longitudinally as shown in FIG. 4, the torsional stresses will cause a circumferential electric field. The torsional mode can be adjusted by shorting the electric field. This is done by plating longitudinal strips 23 connected by variable impedances 27 and 28 on cylinder 11 and electrically connecting the strips. Depending on the degree of tuning required, a different number of strips can be used in conjunction with a variable impedance. These strips or shorting electrodes are normally located in symmetrically positioned pairs.

For a cylinder polarized circumferentially, the generated electric field caused by torsional stress will be longitudinal as shown in FIG. 5. The shorting electrodes 24 can be plated on the ends of cylinder 11 and connected with variable impedances 29 and 30.

What is claimed is:
1. An apparatus for determining angular velocity of a rotating object comprising:
   (a) a piezoelectric cylinder mounted on the rotating object;
   (b) an oscillator connected to the cylinder for causing radial vibration of the cylinder while the cylinder rotates causing torsional vibration thereof, the torsional vibration being indicative of angular velocity;
   (c) and means for tuning the cylinder wherein the tuning means comprise;
      plated strips longitudinally connected to the cylinder in pairs and variable impedances connecting pairs of the strips.
2. An apparatus for determining angular velocity of a rotating object comprising:
   (a) a piezoelectric cylinder mounted on the rotating object;
   (b) an oscillator connected to the cylinder for causing radial vibration of the cylinder while the cylinder rotates causing torsional vibration thereof, the torsional vibration being indicative of angular velocity;
   (c) and means for tuning the cylinder wherein the tuning means comprise;
      plated electrodes connected to both rims of the cylinder and variable impedances connecting corresponding electrodes from opposite rims.

References Cited by the Examiner
UNITED STATES PATENTS

| | | | |
|---|---|---|---|
| 3,024,371 | 3/1962 | Lefkowitz | 310—5 |
| 3,174,122 | 3/1965 | Fowler et al. | 333—72 |
| 3,182,512 | 11/1965 | Jones et al. | 73—505 |
| 3,238,476 | 3/1966 | Borner et al. | 310—9.6 |

RICHARD C. QUEISSER, *Primary Examiner.*
MILTON O. HIRSCHFIELD, *Examiner.*
J. D. MILLER, J. J. GILL, *Assistant Examiners.*